United States Patent
Souza et al.

(10) Patent No.: US 11,494,611 B2
(45) Date of Patent: Nov. 8, 2022

(54) METADATA-BASED SCIENTIFIC DATA CHARACTERIZATION DRIVEN BY A KNOWLEDGE DATABASE AT SCALE

(71) Applicant: International Business Machines Corporation, Armonk, NY (US)

(72) Inventors: Renan Francisco Santos Souza, Rio de Janeiro (BR); Reinaldo Mozart da Gama e Silva, Rio de Janeiro (BR); Rodrigo da Silva Ferreira, Rio de Janeiro (BR); Emilio Ashton Vital Brazil, Rio de Janeiro (BR); Viviane Torres da Silva, Rio de Janeiro (BR)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 145 days.

(21) Appl. No.: 16/527,546

(22) Filed: Jul. 31, 2019

(65) Prior Publication Data
US 2021/0034948 A1 Feb. 4, 2021

(51) Int. Cl.
*G06N 3/04* (2006.01)
*G06F 16/242* (2019.01)
*G06F 16/2455* (2019.01)
*G06F 16/2457* (2019.01)
*G06F 16/14* (2019.01)

(52) U.S. Cl.
CPC ......... *G06N 3/0445* (2013.01); *G06F 16/144* (2019.01); *G06F 16/2448* (2019.01); *G06F 16/24564* (2019.01); *G06F 16/24573* (2019.01)

(58) Field of Classification Search
CPC ............. G06F 16/144; G06F 16/24573; G06F 16/2448; G06F 16/24564; G06N 3/0445
See application file for complete search history.

(56) References Cited

U.S. PATENT DOCUMENTS

| | | | |
|---|---|---|---|
| 9,596,196 B1* | 3/2017 | Hills | H04L 51/16 |
| 2006/0224750 A1* | 10/2006 | Davies | H04W 4/12 709/229 |
| 2009/0254971 A1* | 10/2009 | Herz | G06Q 30/0603 726/1 |

(Continued)

FOREIGN PATENT DOCUMENTS

CN 104142980 A 11/2014

OTHER PUBLICATIONS

Wikipedia, Machine learning, accessed Nov. 17, 2021 (Year: 2021).*

(Continued)

*Primary Examiner* — William Spieler
(74) *Attorney, Agent, or Firm* — Joseph Petrokaitis, Esq.; McGinn I.P. Law Group, PLLC.

(57) ABSTRACT

A metadata-based scientific data characterization method, system, and computer program product include requesting a user input for a task to specify a rule for the task to determine a quality and a relationship of a data file in a data file database based on metadata associated with the data file, processing a user feedback of results using the rule run on the data file database and tracking the user feedback on the results in order to learn from the user feedback, and based on the learning, creating a modified rule to determine a quality and a relationship of a second data file.

12 Claims, 9 Drawing Sheets

(56) References Cited

U.S. PATENT DOCUMENTS

| | | |
|---|---|---|
| 2011/0217685 A1 | 9/2011 | Srinivasan et al. |
| 2012/0317155 A1 | 12/2012 | Ogasawara et al. |
| 2013/0238563 A1 | 9/2013 | Amarendran et al. |
| 2014/0181130 A1 | 6/2014 | Davis et al. |
| 2014/0351258 A1 | 11/2014 | Dayan et al. |
| 2015/0350380 A1* | 12/2015 | Choi ................ H04M 1/72457 709/203 |
| 2016/0253340 A1 | 9/2016 | Barth et al. |
| 2016/0277332 A1* | 9/2016 | Luman .................... H04L 51/02 |
| 2017/0286524 A1 | 10/2017 | Lu et al. |
| 2018/0096000 A1 | 4/2018 | Harrison et al. |

OTHER PUBLICATIONS

Mel, et al. "The NIST Definition of Cloud Computing". Recommendations of the National Institute of Standards and Technology. Nov. 16, 2015.

\* cited by examiner

REQUESTING A USER INPUT TO SPECIFY A RULE TO DETERMINE A QUALITY AND A RELATIONSHIP OF A SCIENTIFIC DATA FILE BASED ON ASSOCIATED METADATA WITH THE SCIENTIFIC DATA FILE — 101

PROCESSING A USER FEEDBACK TO ANALYZE RESULTS AND TRACK THE USER FEEDBACK ON THE RESULTS IN ORDER TO LEARN FROM THE USER FEEDBACK — 102

BASED ON THE LEARNING, CREATING A RULE TO DETERMINE A QUALITY AND A RELATIONSHIP OF A SCIENTIFIC DATA FILE — 103

FIG. 8
First, users need to determine the quality of a data file.
Example:
User observes one of the files, opens it, and based on associated *metadata to the file*, user identifies that
File A has associated geographic coordinates
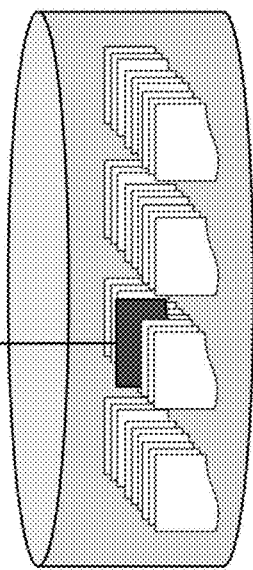
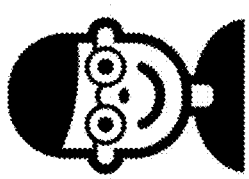
User

METADATA-BASED SCIENTIFIC DATA CHARACTERIZATION DRIVEN BY A KNOWLEDGE DATABASE AT SCALE

BACKGROUND

The present invention relates generally to a metadata-based scientific data characterization method, and more particularly, but not by way of limitation, to a system, method, and computer program product for interactively and iteratively systematizing the way a user uses associated metadata to characterize a few files and applying it at scale.

Scientific, large domain-specific data files have associated metadata that are essential for the scientific experimentation process. However, these files are often heterogeneous. Some files have more or better associated metadata than others, and some files are related to other files.

Conventionally, when users (e.g., scientists, such as geophysicists in a geology domain, an agronomist in an agriculture domain, etc.) acquire a huge amount of data files, they first need to characterize the files by determining the level of quality of a file and finding relationships among them (e.g., a file is derived from another, or is equal to another, or geographically intersects a region in another file) so they can start their experimentation process. This is even more critical when the data files are acquired from public data providers. Although the data contents in a single file are commonly big (hundreds of gigabytes), very often the associated metadata in those files are small (e.g., few megabytes). Such data characterizations are extremely expensive if done based on the data instead of the metadata. Thus, they are usually done by manual inspection based on metadata. And, manual inspection does not scale for a very large amount of data distributed across several data files.

However, even though the conventional techniques may leverage metadata extracted from raw data files to represent them in the data management life cycle, the conventional techniques do not consider a technique for a user iteratively and interactively changing rules based on metadata to be applied to multiple data files, and a learning system collecting user interactions to improve the rules definition.

SUMMARY

In an exemplary embodiment, the present invention provides a computer-implemented metadata-based scientific data characterization method, the method including requesting a user input to specify a male to determine a quality and a relationship of a scientific data file based on associated metadata with the scientific data file, processing a user feedback to analyze results and track the user feedback on the results in order to learn from the user feedback, and based on the learning, creating a rule to determine a quality and a relationship of a scientific data file.

One or more other exemplary embodiments include a computer program product and a system, based on the method described above.

Other details and embodiments of the invention are described below, so that the present contribution to the art can be better appreciated. Nonetheless, the invention is not limited in its application to such details, phraseology, terminology, illustrations and/or arrangements set forth in the description or shown in the drawings. Rather, the invention is capable of embodiments in addition to those described and of being practiced and carried out in various ways and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

Aspects of the invention will be better understood from the following detailed description of the exemplary embodiments of the invention with reference to the drawings, in which:

FIG. 1 exemplarily shows a high-level flow chart for a metadata-based scientific data characterization method 100 according to an embodiment of the present invention;

FIGS. 7-9 exemplarily depict a general use case for the invention and problem solved according to an embodiment of the present invention.

DETAILED DESCRIPTION

Figure 2:
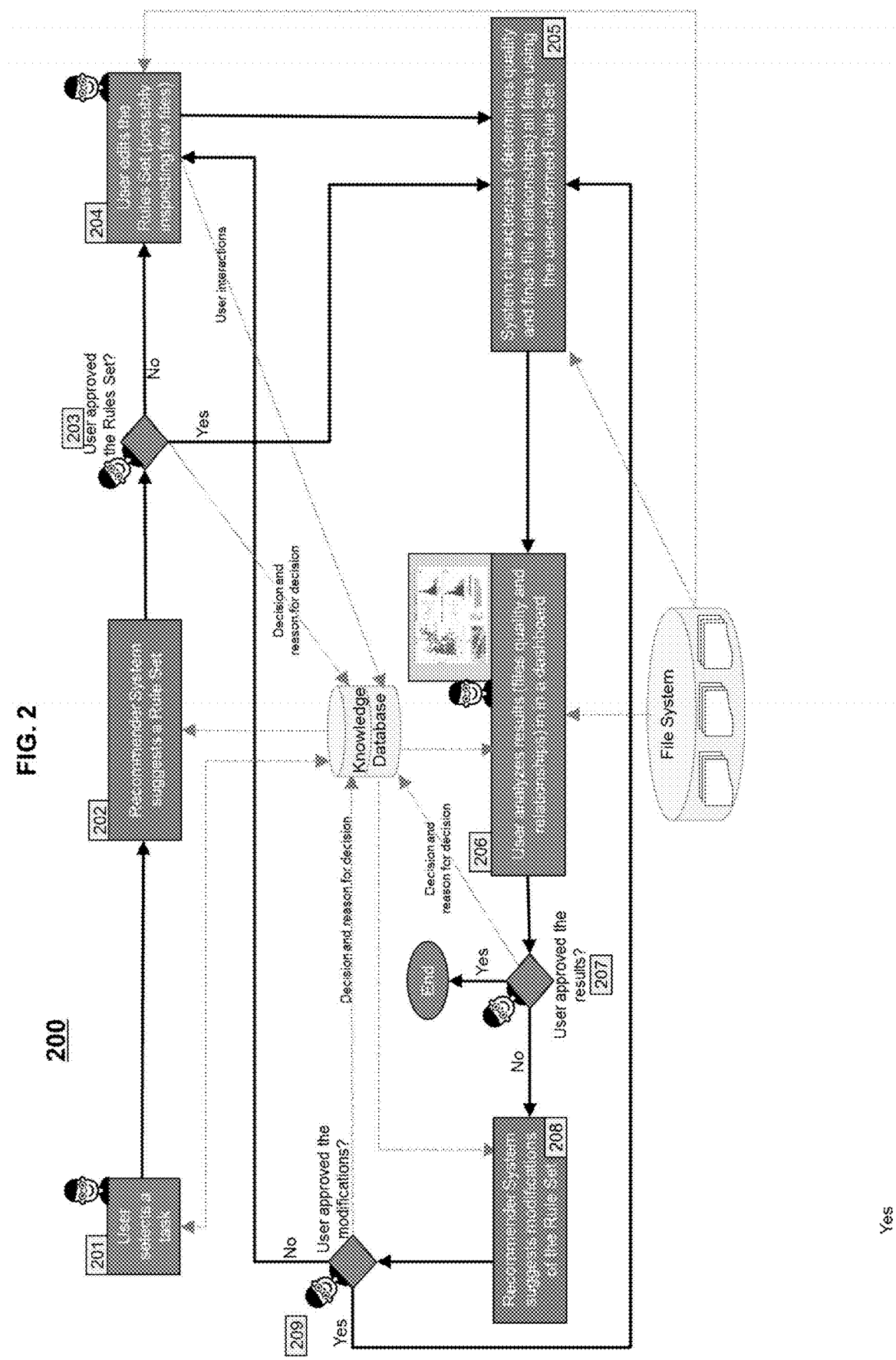
FIG. 2 exemplarily depicts an example flow of metadata-based scientific data characterization according to an embodiment of the present invention.

The invention will now be described with reference to FIGS. 1-9, in which like reference numerals refer to like parts throughout. It is emphasized that, according to common practice, the various features of the drawings are not necessarily to scale. On the contrary, the dimensions of the various features can be arbitrarily expanded or reduced for clarity.

By way of introduction of the example depicted in FIG. 1, an embodiment of a metadata-based scientific data characterization method 100 according to the present invention can include various steps for a hybrid rule and learning-based technique that enables users to interactively and iteratively guide a rule-based processing that characterizes multiple, large raw data files to (i) determine files' quality and (ii) find data relationships, taking advantage of small metadata associated to large files. Rules may be recommended by a machine learning-based recommender component at each new iteration of the process. The user can accept the recommendations or adjust the recommended rules. Thus, rules are controlled by the user's knowledge, driven by the application and domain. And, the user's interactivity and rules modifications are recorded in a Knowledge Database to improve the recommender component.

Thereby, an advantage of the invention is that it uses human knowledge for a few files, applies it at scale to a large amount of files, and learns from users' interactions. The advantage is possible because the invention takes advantage of small metadata associated to large files to reduce the processing response time between the user and the system, thereby making the system more interactive. Then, both the invention (e.g., using a machine learning-based component)

and the user together cooperate until achieving the best rule set and results (e.g., characterized data files).

Figure 4:
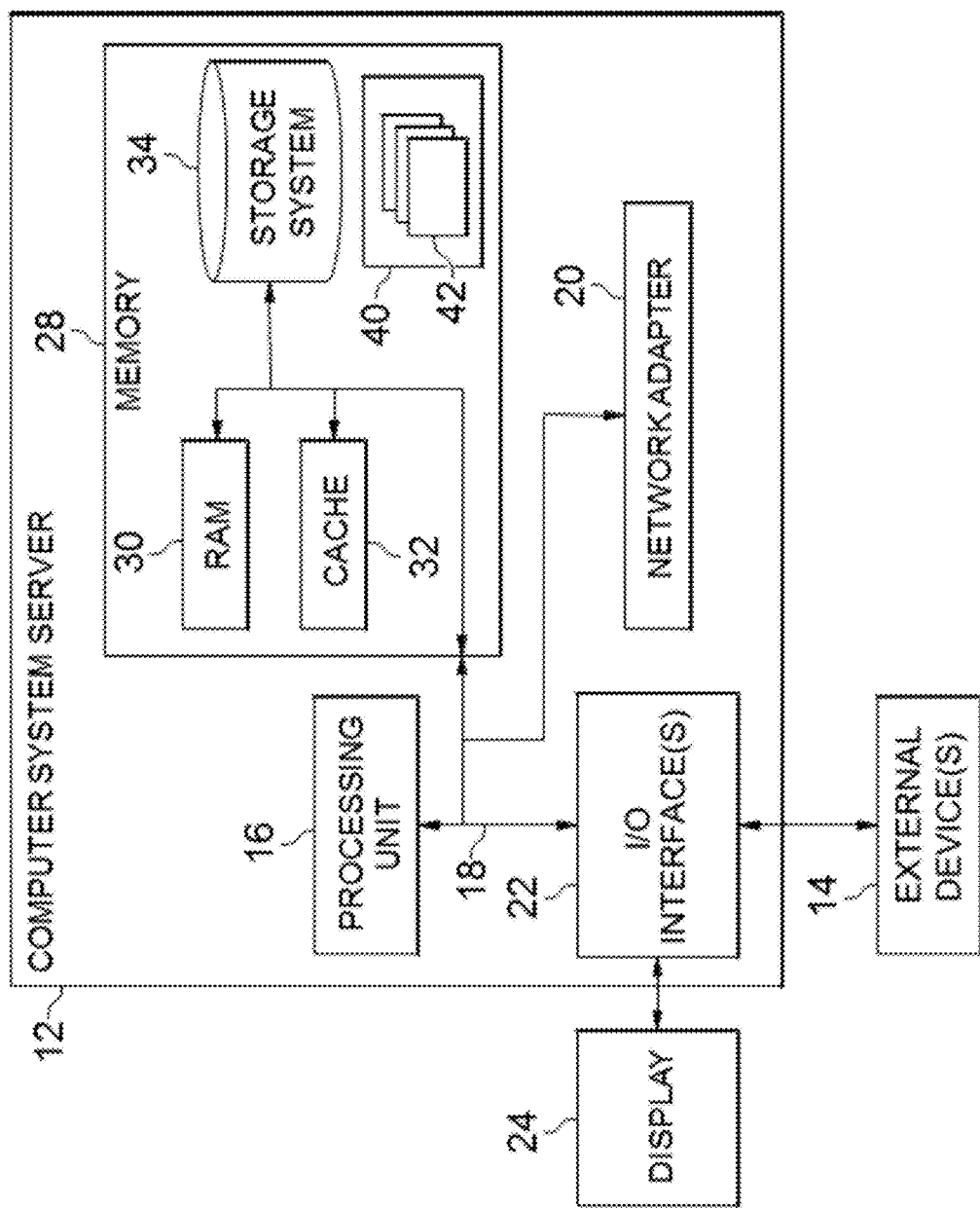
FIG. 4 depicts a cloud-computing node 10 according to an embodiment of the present invention.

By way of introduction of the example depicted in FIG. 4, one or more computers of a computer system 12 according to an embodiment of the present invention can include a memory 28 having instructions stored in a storage system to perform the steps of FIG. 1.

Although one or more embodiments may be implemented in a cloud environment 50 (e.g., FIG. 6), it is nonetheless understood that the present invention can be implemented outside of the cloud environment.

Figure 7:
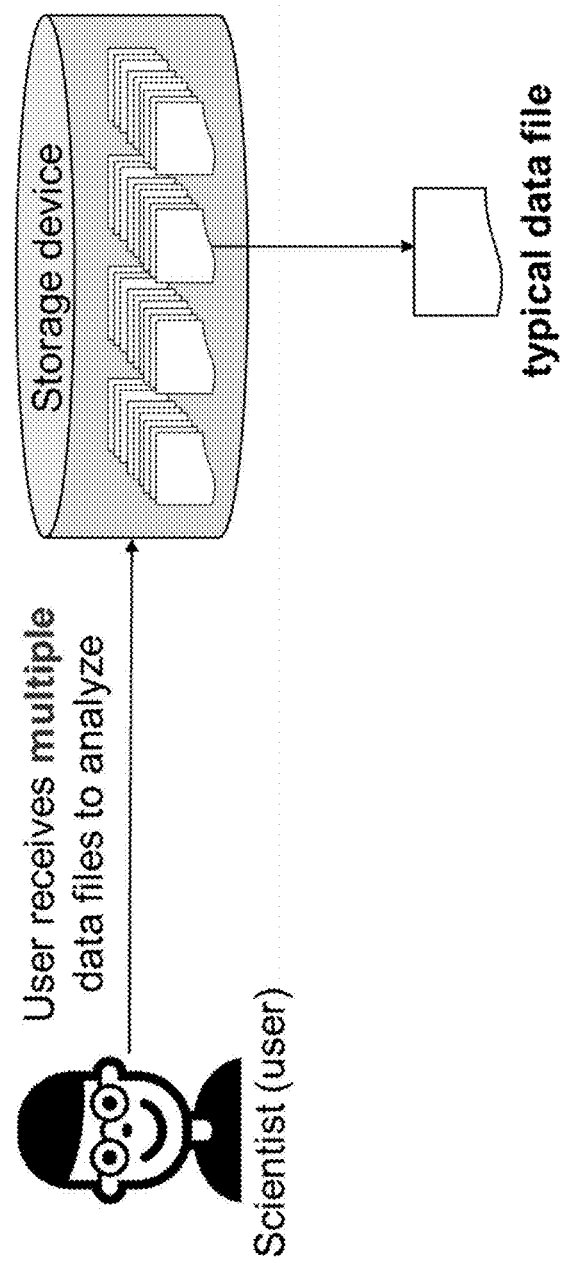
Figure 9:
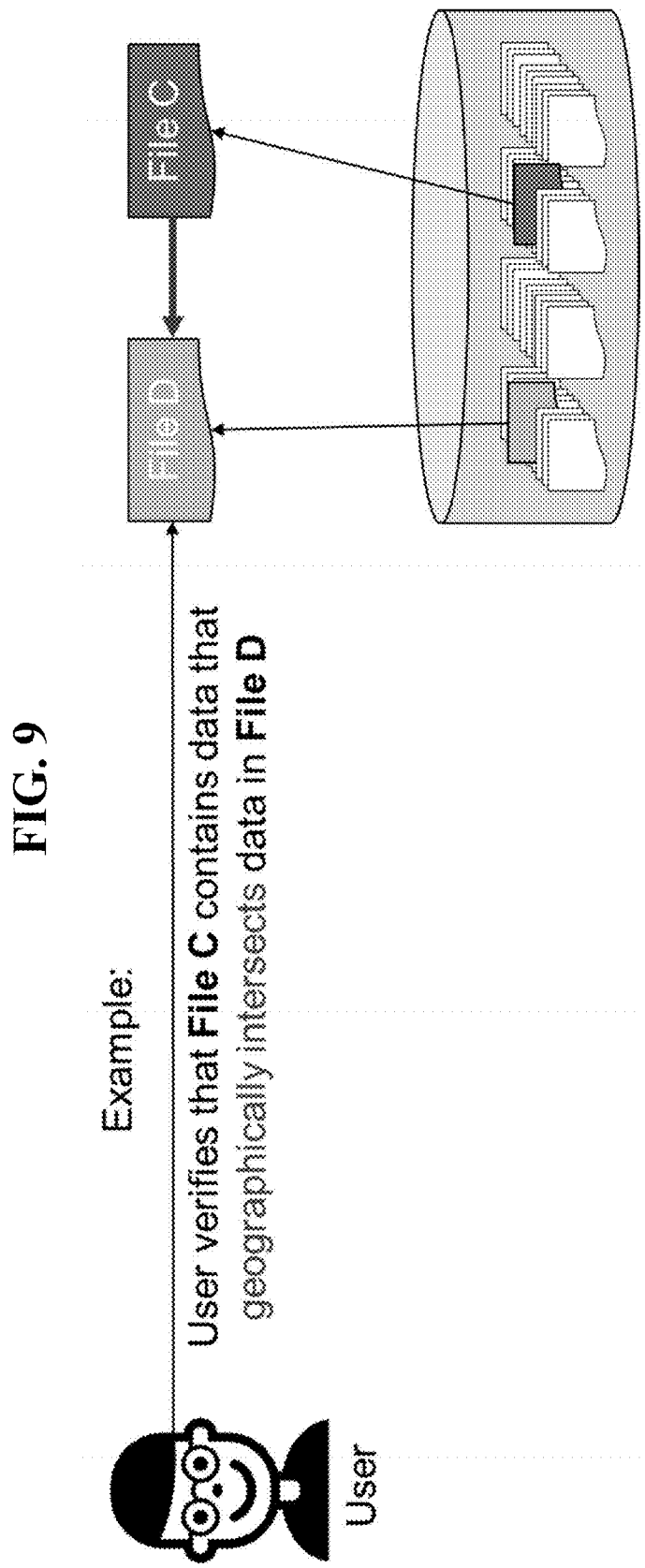

With reference to FIGS. 7-9, a context of a problem solved by the invention is exemplarily explained. As shown in FIG. 7, a user (e.g., a scientist such as a geophysicist, agronomist, health scientist, etc.) receives multiple data files to analyze from a storage device. A typical data file is large (i.e., up to hundreds of gigabytes), a specialized file format (e.g., GeoTIFF, common in agriculture applications, or formats specified by industrial standards such as SEG-Y for geological applications, etc.), contains important associated metadata, etc. However, files are heterogeneous. Some have high quality and relevant metadata for a given use, but some do not.

With reference to FIG. 8, first, users need to determine the quality of a data file. As an example, a user observes one of the files, opens it, and based on associated metadata to the file, the user identifies that "File A" has associated geographic coordinates.

With reference to FIG. 9, second, users must identify relationships among these files. Only after determining the quality and identifying the file relationships, can users start their experimental process. For example, a user verifies that File C contains data that geographically intersects data in File D (e.g., C and D are seismic data whose polygons partially cover the same geographic area).

However, traditionally, a user manually inspects the files to determine their quality and relationships. Manual inspection works well for one file or possibly a few number of files. However, it does not scale to huge amount of files. Thereby, missing an opportunity to learn from the users' interactions when they reason over a file. However, with the invention of method 100, the invention can interactively and iteratively systematize the way a user uses associated metadata to characterize a few files and apply it at scale, and improve the results as the user uses the invention.

With reference generally to FIGS. 1 and 2, in step 101, a user input is requested to specify a rule to determine a quality and a relationship of a scientific data file based on associated metadata with the scientific data file.

In step 102, a user feedback is processed to analyze results and track the user feedback on the results in order to learn from the user feedback.

In step 103, based on the learning, a rule is created to determine a quality and a relationship of a scientific data file.

More specifically, with reference to FIG. 2, in step 201, the user selects a task. For example, given an input dataset of multiple, large data files, the task is to "Identify seismic files", "geolocate them", "Identify which files are seismic amplitude and Which are attributes derived of a seismic event", and "Identify reports (PDF, DOC) related to seismic files".

In step 202, the invention suggests a rule set. For example, a rule exemplarily recommended by the invention can be:
*File identification. File A
IF A has extension in [sgy, cbvs, sgd] THEN A is a seismic data file IF A has extension in [pdf, txt, rtf, doe, docx] THEN A is a report
IF A has extension in [csv, xls, json, geotiff] THEN A is a metadata file Then, in step 203, the user approves or rejects the recommended rules. User decisions and reasons are stored in the Knowledge Database.

In step 204, the user adjusts the recommended rules. Rules versioning is stored in the Knowledge Database for improvements of the Recommender System.

In step 205, the invention characterizes (e.g., determines quality and finds file relationships) all files using the user-informed Rule Set. That is, the invention uses the rules approved by the user and then applies to all files in the input dataset to Characterize the files.

In step 206, the user analyzes results (e.g., files quality and relationships) in in a dashboard. For example, more than 50% of the files in the input dataset have .SU extension and the system was not able to identify these files. These results are stored in the Knowledge Database.

In step 207, the user approves the results and either the process ends or the process continues to step 208.

In step 208, modifications to the rule(s) are suggested by the invention based on the user not approving the rule(s) in step 207. For example, the invention recommends modifications on the rule set such as "IF A has extension in [sgy, cbvs, sgd, su] THEN A is a seismic data file".

In step 209, the user approves (or not) the modified rule set. If approved, then the invention returns to step 205. If the user does not approve the rule set, then the invention proceeds hack to step 204.

In one exemplary use case for an oil and gas business case, a data scientist in the geology domain received a public, large (terabytes) geological dataset containing thousands of data files from different areas in the world. He needs to use these data for training machine learning models to help him in an oil reservoir discovery. The problem is that the data files are not characterized (e.g., not geolocalized, files have no known relationships (e.g., does a file contain a seismic amplitude or a derived attribute from a seismic), thus this dataset cannot be consumed by the expert in a practical time.

Therefore, following steps 101-103 and 201, the user selects a task, identifies files, finds relationships, and determines quality:
Task: Seismic dataset characterization and geolocalization
  Identify files
    Which are seismic data files
    Which are reports (PDFs)
  Find relationships
    Which files are attributes (e.g., spontaneous frequency) of a seismic
    Which tiles contain metadata associated to a seismic
    Which files contain data that geographically intersect other files
    Which reports (PDFs) are related to a seismic data file
    Which files are duplicate
  Determine quality
    Which have geographic coordinates
    Structured associated processing and acquisition information Based on this, the invention recommends a rule set in step 103 and 202 such as:
*File identification. File A
IF A has extension in [sgy, cbvs, sgd] THEN A is a seismic data file IF A has extension in [pdf, txt, rtf, doc, docx] THEN A is a report
IF A has extension in [csv, xls, json, geotiff] THEN A is a metadata file
*File relationships. File A and File B
IF B is in the same directory hierarchy of A THEN B is associated to A.
IF A has the same embedded metadata of B AND size (A)>>size(B)
THEN B is a product of A
   IF B has file name containing [ip, is, impedance] THEN B is a impedance product of A
   IF B has tile name containing [vp, vs, velocity] THEN B is a velocity product of A
   IF A has the embedded metadata of B AND size(A)=size(B) THEN A=B
*File quality. Seismic data file A
M is a set of associated metadata to A
K are key metadata. K=[GeoX, GeoY, UTMZone]
H(K) are values for metadata in K that the system could find.
Key metadata should be found as follows:
GeoX is in M, embedded in byte 181 of A
GeoY is in M, embedded in byte 185 of A
UTMZone is in M, in a metadata tile associated to A
*Quality Level of a Seismic data file A
Level 0: H(K)=NULL=>"System could not determine any value for K"
Level 1: H(K).GeoX!=NULL and H(K).GeoY!=NULL and H(K).UTMZone=NULL=>"System could determine GeoX, GeoY, but no UTM Zone"
Level 2: H(K).GeoX!=NULL and H(K).GeoY!=NULL and H(K).UTMZone=NULL and User validated=>"No UTM Zone, but user validated GeoX, GeoY"
Level 3: H(K)!=NULL ==========> "System is able to geolocate A"
Level 4: H(K)!=NULL and User validated ==========> "System is able to geolocate A and user validated"

Then, the invention proceeds through the remainder of steps 203-209. For example:
User approved the recommended Rule Set
(C) System 200 runs. Iteration=1
(D) Results are plotted in a dashboard and user analyzes.
Result: More than 50% of the files in the input dataset have .SU extension and the system was not able to identify the file.
User did NOT approve the results
(E) System 204 suggests modification of the Rule Set
Based on file frequency and embedded metadata analysis, the system suggests: Consider .SU as a Seismic Data file.
Rule to be changed:
   IF A has extension in [sgy, cbvs, sgd, su] THEN A is a seismic data file
User approved the recommended Rule Set
(C) System 200 runs. Iteration=2
(D) Results are plotted in a dashboard and user analyzes.
Result: In nearly 100% of SU files, it was not possible to find GeoX, GeoY. Error: GeoX and GeoY information not in specified bytes (181-185)
User did NOT approve the results
(E) System 204 suggests modification of the Rule Set
Based on heuristics and on past user interactions, the system suggests: Consider the bytes 72 and 73 in embedded seismic data file for GeoX and GeoY coordinates.
Rue to be changed:
Key metadata should be found as follows:
GeoX is in M, embedded in byte 72 of A
GeoY is in M, embedded in byte 73 of A
User did NOT approve the recommended Rule Set and explains why:
By inspecting inspects few data files, user verifies that, in this dataset, bytes 72 and 73 are being used for inline_no and xline_no fields, rather than GeoX and GeoY.
(F) User edits the Rule Set as follows:
Key metadata should be found as follows:
GeoX is in M, embedded in byte 27 of A
GeoY is in M, embedded in byte 28 of A
(C) System 200 runs. Iteration=3
(D) Results are plotted in a dashboard and user analyzes.
Result: in 100% of seismic data files are qualified as "3-Level Quality" (i.e., were geolocated)
User approved results
System registers that these results are good for this user.

Figure 3:
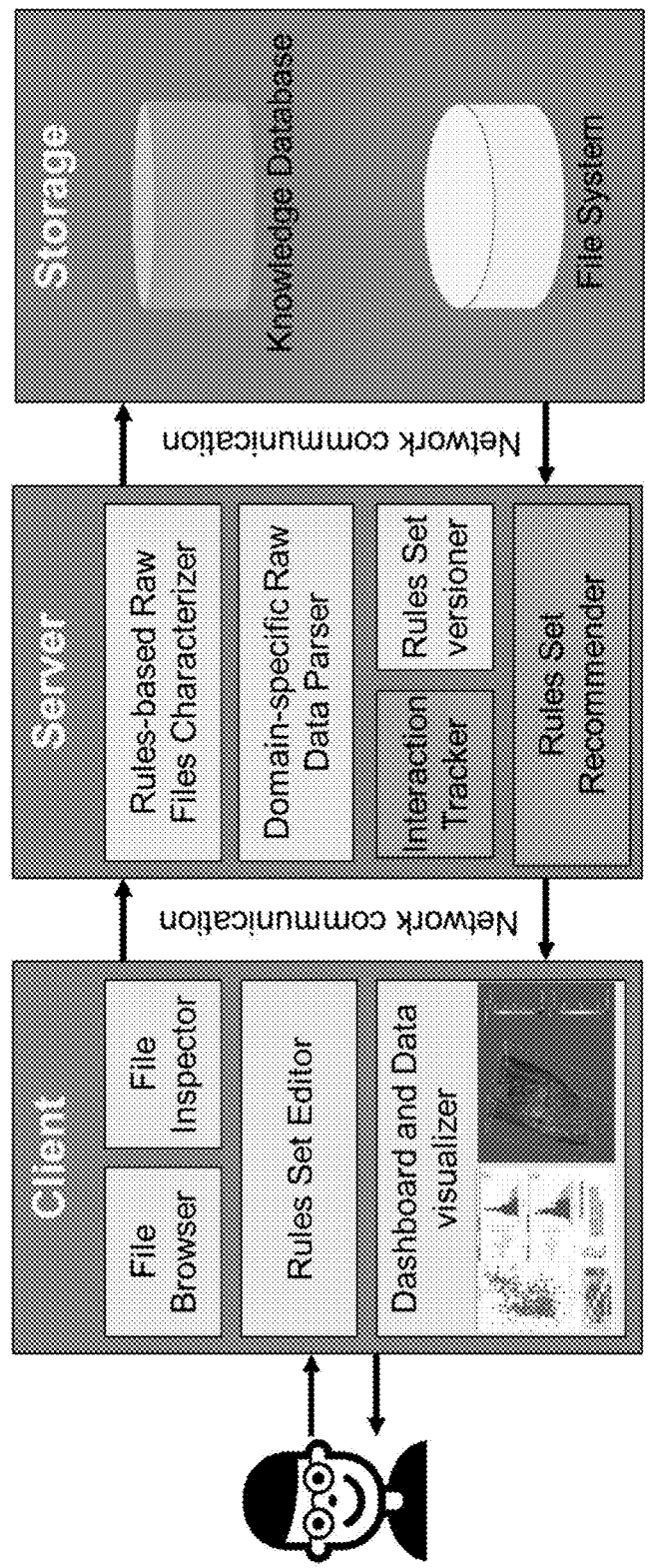
FIG. 3 exemplarily depicts an example system 300 of metadata-based scientific data characterization according to an embodiment of the present invention.

With reference to FIG. 3, the system architecture includes an interface for the client (i.e., user), a server, and a storage layer. The interface for the user includes a file browser and file inspector, where users choose files and inspect metadata associated with a file, a rule set editor that presents recommended rules to the user and allows the user to modify the set, a dashboard that shows results of the processing, and also shows tiles characterized (e.g., with qualified files and discovered relationships) according to a specified rule set.

The server includes a rules-based, raw data file characterizer component that receives (a) a Rules Set as input and (b) the list of files that should be processed. The server dispatches a sealable processing in a parallel hardware making use of a Domain-specific raw data parser (201) to parse the raw data files, extract metadata and use the associated metadata to characterize the tiles (e.g., set the tile quality and find relationships). Not only does the characterizer component not need to process the entire large data file, but it also does not need to compute all metadata associated to a file. Only the ones specified in the Rule Set, hence speeding up processing even more. The domain-specific raw data parser implements a piece of software that knows how to read specialized file formats, such as SEG-Y for seismic, LAS for well logs, GeoTIFF for agriculture, FITS for astronomy, etc. An interaction tracker records interactions between the user and the system in a structured way in the Knowledge Database (300). A rules set versioner is responsible to track every change a user does in the Rule Set and relate the new modifications to a reason optionally informed by the user for the change. Rules Set, their versioning, and reason for changes are stored in the Knowledge Database (300). And, a rules set recommender is a machine-learning-based service that uses data in the Knowledge Base to train its models and recommend rules or modifications of a previously selected Rule Set.

The storage layer includes a knowledge database that contains user knowledge stored in a structured way that can be queried. The following data are stored and represented in the Knowledge Database: users interaction, the rule set and their modifications along the iterations, if user accepted or not recommendations, the reason for the user decision (e.g., of acceptance), and the data files characterization. And, a file system that contains all files to be characterized.

With the above embodiments, the invention includes a hybrid rule and learning-based system and method that enable users to interactively and iteratively guide a rule-based processing that characterizes multiple large raw data files to (i) determine files' quality and (ii) find data relationships, taking advantage of small metadata associated to large files. Rules are recommend by a machine learning-based recommender component at each new iteration of the process. A user can accept the recommendations or adjust the recommended rules. Rules are thus controlled by the user's knowledge, driven by the application and domain. The user interactivity and rules modifications are recorded in a Knowledge Database to improve the recommender component. The inventive model is independent of a specific neural network or machine learning model.

Thus, the invention can use human knowledge for a few files, apply the human knowledge at scale to a huge amount of files, and learn from users interactions. This is only possible because the invention takes advantage of small metadata associated with large files to reduce the processing response time between the user and the system, making the system more interactive. Then, both the system (e.g., using a machine learning-based component) and the user together cooperate until achieving the best rule set and results (e.g., characterized data files).

It is noted that although the embodiments herein are described in terms of "metadata-based scientific data", the invention is not limited thereto. For example, the invention can include embodiments directed towards generic data classification (i.e., data records, tax data, corporate business data, educational data, etc.). Indeed, the invention can determine the quality and relationship of the data in a mass scale level based on a few classifications of a user such that large databases of any type of data can be classified.

Exemplary Aspects, Using a Cloud Computing Environment

Although this detailed description includes an exemplary embodiment of the present invention in a cloud computing environment, it is to be understood that implementation of the teachings recited herein are not limited to such a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned acid reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client circuits through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (Paas): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy; and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 4, a schematic of an example of a cloud computing node is shown. Cloud computing node 10 is only one example of a suitable node and is not intended to suggest any limitation as to the scope of use or functionality of embodiments of the invention described herein. Regardless, cloud computing node 10 is capable of being implemented and/or performing any of the functionality set forth herein.

Although cloud computing node 10 is depicted as a computer system/server 12, it is understood to be operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop circuits, multiprocessor systems, microprocessor-based systems, set top boxes, programmable consumer electronics, network PCs, minicomputer systems, mainframe computer systems, and distributed cloud computing environments that include any of the above systems or circuits, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing circuits that are linked through a communications network. In a distributed cloud computing environment, program modules may be located in both local and remote computer system storage media including memory storage circuits, Referring now to FIG. 4, a computer system/server 12 is shown in the form of a general-purpose computing circuit. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus, Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further described below, memory 28 may include a computer program product storing one or program modules 42 comprising computer readable instructions configured to carry out one or more features of the present invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may be adapted for implementation in a networking environment. In some embodiments, program modules 42 are adapted to generally carry out one or more functions and/or methodologies of the present invention.

Computer system/server 12 may also communicate with one or more external devices 14 such as a keyboard, a pointing circuit, other peripherals, such as display 24, etc., and one or more components that facilitate interaction with computer system/server 12. Such communication can occur via Input/Output (I/O) interface 22, and/or any circuits (e.g., network card, modem, etc.) that enable computer system/server 12 to communicate with one or more other computing circuits. For example, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, circuit drivers, redundant processing units, external disk drive arrays, RAID systems, tape drives, and data archival storage systems, etc.

Figure 5:
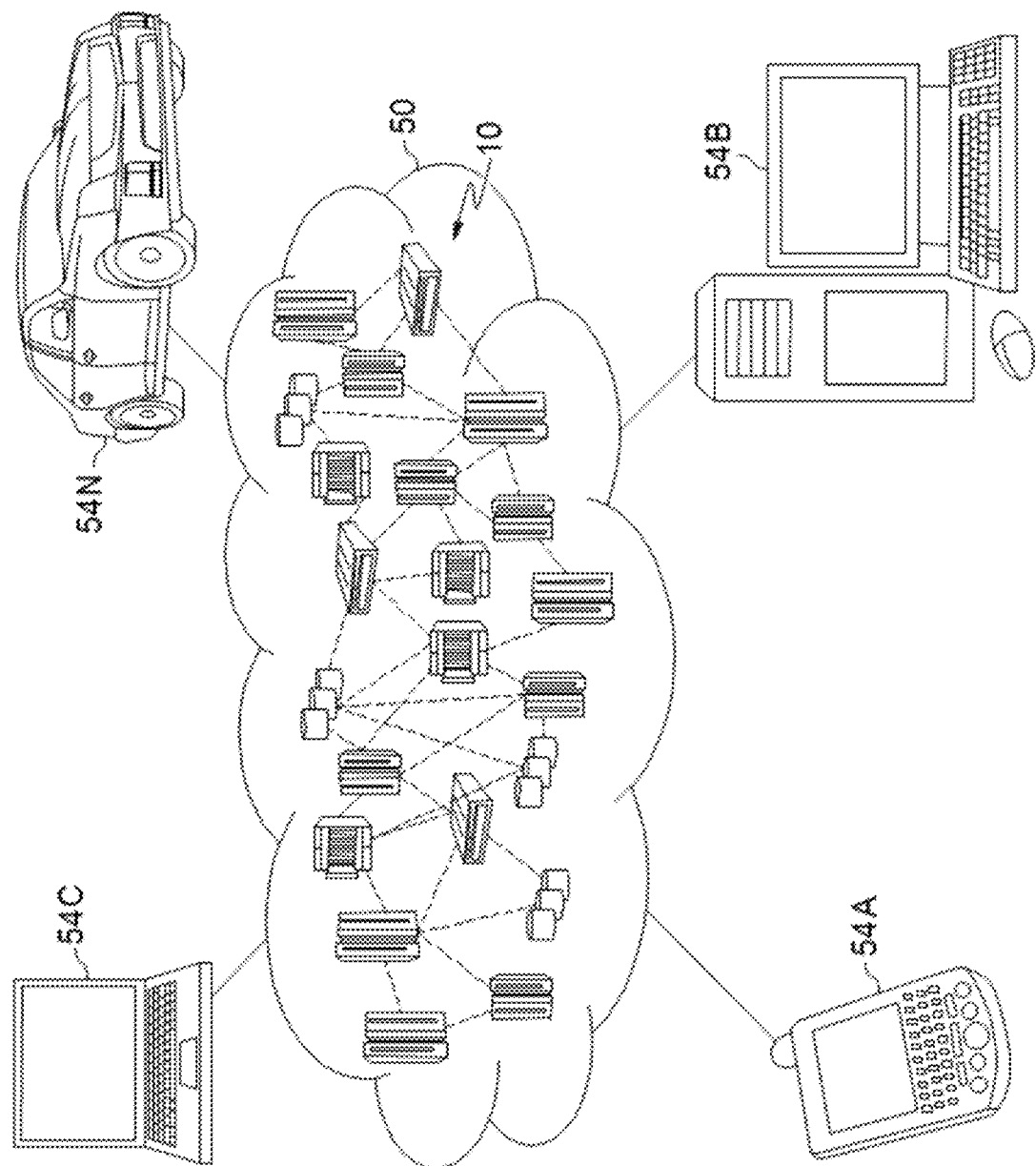
FIG. 5 depicts a cloud-computing environment 50 according to an embodiment of the present invention.

Referring now to FIG. 5, illustrative cloud computing environment 50 is depicted. As shown, cloud computing environment 50 comprises one or more cloud computing nodes 10 with which local computing circuits used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing circuit. It is understood that the types of computing circuits 54A-N shown in FIG. 5 are intended to be illustrative only and that computing nodes 10 and cloud computing environment 50 can communicate with any type of computerized circuit over any type of network and/or network addressable connection (e.g., using a web browser)

Figure 6:
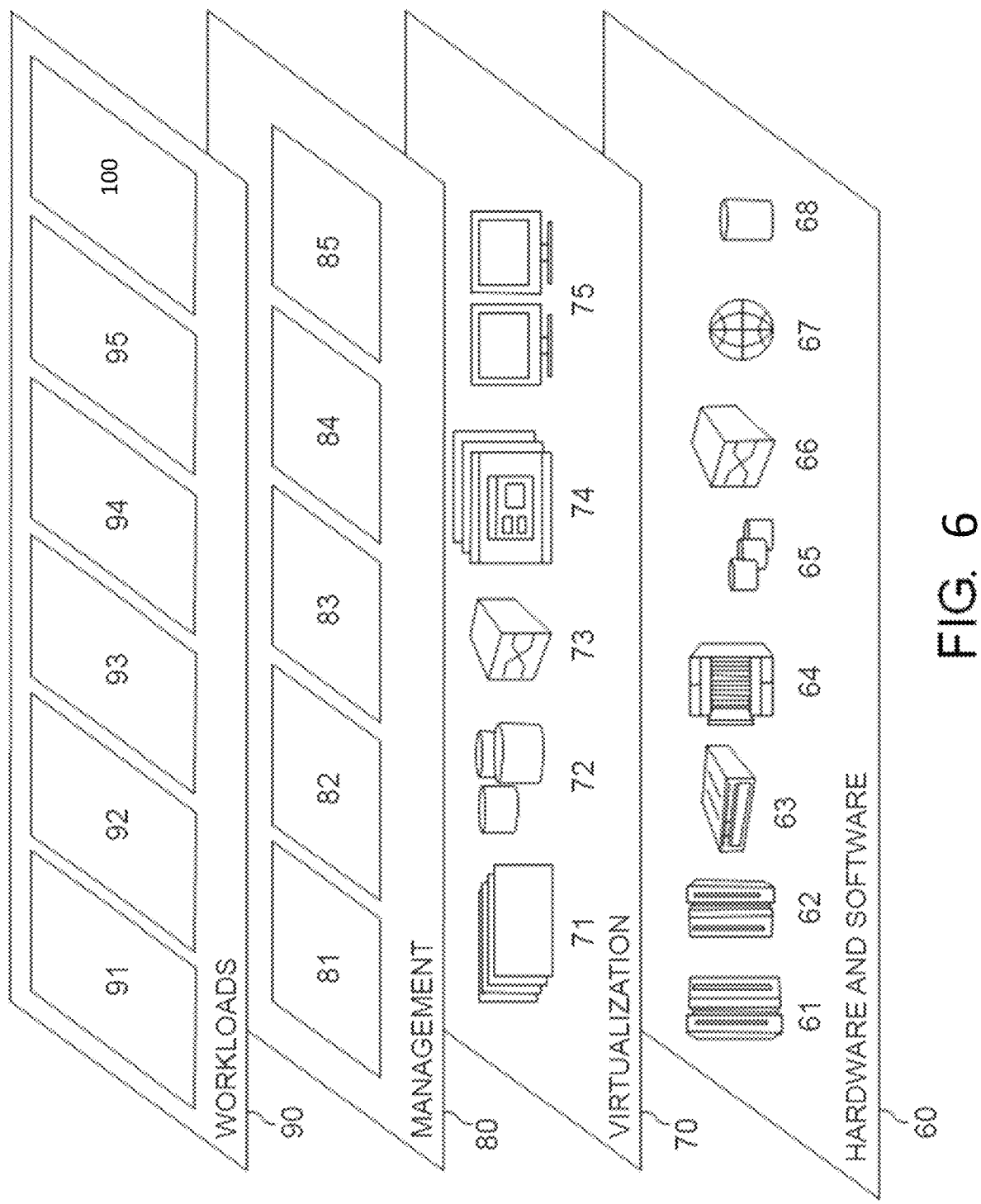
FIG. 6 depicts abstraction model layers according to an embodiment of the present invention.

Referring now to FIG. 6, an exemplary set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage circuits 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and metadata-based scientific data characterization method 100 in accordance with the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which exec on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Further, Applicant's intent is to encompass the equivalents of all claim elements, and no amendment to any claim of the present application should be construed as a disclaimer of any interest in or right to an equivalent of any element or feature of the amended claim.

What is claimed is:

1. A computer-implemented metadata-based characterization method for a knowledge database including heterogeneous files, the method comprising:
    based on a task, requesting a user input to specify a rule that characterizes a single raw data file of the heterogeneous files in the knowledge database according to an extension name and associated metadata such that both of a quality and a relationship of the single raw data file in the knowledge database is determined by the user with respect to the task, the relationship that is input by the user input being between the single raw data file and another data file in the knowledge database and being an intersection of a content of data between the single raw data file and another data file;
    applying, via a processor including scalable processing in a parallel hardware making use of a domain-specific raw data parser running a machine-learning based service, the rule at scale against a plurality of data files in the knowledge database to identify other data files of the plurality of data files that have a same relationship and associated metadata specified in the rule by only processing the data files with metadata specified in the rule thereby speeding up processing by not processing entire knowledge database;
    processing, via the processor running the machine-learning based service, a user feedback of a result including the other data files of the plurality of data files using the rule run on the plurality of data files of the knowledge database and tracking the user feedback on the result in order to learn, via the processor, from the user feedback to identify that other data files having the same relationship specified in the rule are a part of the result;
    based on the user feedback and by iteratively using the machine-learning based service at each iteration, creating a modified rule via the processor, at each iteration, to determine a quality and a relationship of a second data file while also requesting an approval or an adjustment from the user of the modified rule, the modified rule replacing the rule when applying at scale against the knowledge database; and
    recording the modified rule in the knowledge database after the approval or the adjustment from the user to recommend the modified rule for a different user that fits the task,
    wherein the requesting interactively and iteratively systematizes the user input for the metadata associated to characterize a number of data files less than a second number of data files in the knowledge database,
    further comprising determining a quality and a relationship of data files in the knowledge database by applying the modified rule, at scale, on the knowledge database,
    wherein the extension name is correlated with a type of the data file.

2. The method of claim 1, wherein the processing further processes a second user feedback based on the modified rule run at scale to iteratively create a third modified rule, and
    wherein, based on the learning, the third modified rule is created to determine a quality and a relationship of a rest of the data files in the knowledge database.

3. The method of claim 1, wherein, based on the learning, the modified rule is created to determine a quality and a relationship of a rest of the data files in the knowledge database.

4. The method of claim 1, further comprising applying the modified rule for a rest of the data files in the data file database to determine a quality and a relationship of the data files in the knowledge database.

5. The method of claim 4, wherein the processing further processes a second user feedback based on the modified rule run at scale to iteratively create a third modified rule.

6. The method of claim 1, wherein the processing is performed by a cloud computing environment to offload computing requirements from a user device to the cloud computing environment, and
    wherein the cloud computing environment comprises a cloud computing model of a service delivery comprising two or more clouds of a private cloud, a community cloud, and a public cloud that remain unique entities but are bound together by technology that enables data and application portability that results in load-balancing between the two or more clouds.

7. A computer program product for metadata-based characterization, the computer program product comprising a computer-readable storage medium having program instructions embodied therewith, the program instructions executable by a computer to cause the computer to perform:
based on a task, requesting a user input to specify a rule that characterizes a single raw data file of the heterogeneous files in the knowledge database according to an extension name and associated metadata such that both of a quality and a relationship of the single raw data file in the knowledge database is determined by the user with respect to the task, the relationship that is input by the user input being between the single raw data file and another data file in the knowledge database and being an intersection of a content of data between the single raw data file and another data file;
applying, via a processor including scalable processing in a parallel hardware making use of a domain-specific raw data parser running a machine-learning based service, the rule at scale against a plurality of data files in the knowledge database to identify other data files of the plurality of data files that have a same relationship and associated metadata specified in the rule by only processing the data files with metadata specified in the rule thereby speeding up processing by not processing entire knowledge database;
processing, via the processor running the machine-learning based service, a user feedback of a result including the other data files of the plurality of data files using the rule run on the plurality of data files of the knowledge database and tracking the user feedback on the result in order to learn, via the processor, from the user feedback to identify that other data files having the same relationship specified in the rule are a part of the result;
based on the user feedback and by iteratively using the machine-learning based service at each iteration, creating a modified rule via the processor, at each iteration, to determine a quality and a relationship of a second data file while also requesting an approval or an adjustment from the user of the modified rule, the modified rule replacing the rule when applying at scale against the knowledge database; and
recording the modified rule in the knowledge database after the approval or the adjustment from the user to recommend the modified rule for a different user that fits the task,
wherein the requesting interactively and iteratively systematizes the user input for the metadata associated to characterize a number of data files less than a second number of data files in the knowledge database,
further comprising determining a quality and a relationship of data files in the knowledge database by applying the modified rule, at scale, on the knowledge database,
wherein the extension name is correlated with a type of the data file.

8. The computer program product of claim 7, wherein the processing further processes a second user feedback based on the modified rule run at scale to iteratively create a third modified rule, and
wherein, based on the learning, the third modified rule is created to determine a quality and a relationship of a rest of the data files in the knowledge database.

9. The computer program product of claim 7, wherein, based on the learning, the modified rule is created to determine a quality and a relationship of a rest of the data files in the knowledge database.

10. The computer program product of claim 7, further comprising applying the modified rule for a rest of the data files in the data file database to determine a quality and a relationship of the data files in the knowledge database.

11. A metadata-based characterization system, the system comprising:
a processor; and
a memory, the memory storing instructions to cause the processor to perform:
based on a task, requesting a user input to specify a rule that characterizes a single raw data file of the heterogeneous files in the knowledge database according to an extension name and associated metadata such that both of a quality and a relationship of the single raw data file in the knowledge database is determined by the user with respect to the task, the relationship that is input by the user input being between the single raw data file and another data file in the knowledge database and being an intersection of a content of data between the single raw data file and another data file;
applying, via a processor including scalable processing in a parallel hardware making use of a domain-specific raw data parser running a machine-learning based service, the rule at scale against a plurality of data files in the knowledge database to identify other data files of the plurality of data files that have a same relationship and associated metadata specified in the rule by only processing the data files with metadata specified in the rule thereby speeding up processing by not processing entire knowledge database;
processing, via the processor running the machine-learning based service, a user feedback of a result including the other data files of the plurality of data files using the rule run on the plurality of data files of the knowledge database and tracking the user feedback on the result in order to learn, via the processor, from the user feedback to identify that other data files having the same relationship specified in the rule are a part of the result;
based on the user feedback and by iteratively using the machine-learning based service at each iteration, creating a modified rule via the processor, at each iteration, to determine a quality and a relationship of a second data file while also requesting an approval or an adjustment from the user of the modified rule, the modified rule replacing the rule when applying at scale against the knowledge database; and
recording the modified rule in the knowledge database after the approval or the adjustment from the user to recommend the modified rule for a different user that fits the task,
wherein the requesting interactively and iteratively systematizes the user input for the metadata associated to characterize a number of data files less than a second number of data files in the knowledge database,
further comprising determining a quality and a relationship of data files in the knowledge database by applying the modified rule, at scale, on the knowledge database,
wherein the extension name is correlated with a type of the data file.

12. The system of claim 11, wherein the processing further processes a second user feedback based on the modified rule run at scale to iteratively create a third modified rule, and
  wherein, based on the learning, the third modified rule is created to determine a quality and a relationship of a rest of the data files in the knowledge database.

* * * * *